H. A. LUSCOMB.
Coal and Ash Sifters.
No. 155,959. Patented Oct. 13, 1874.
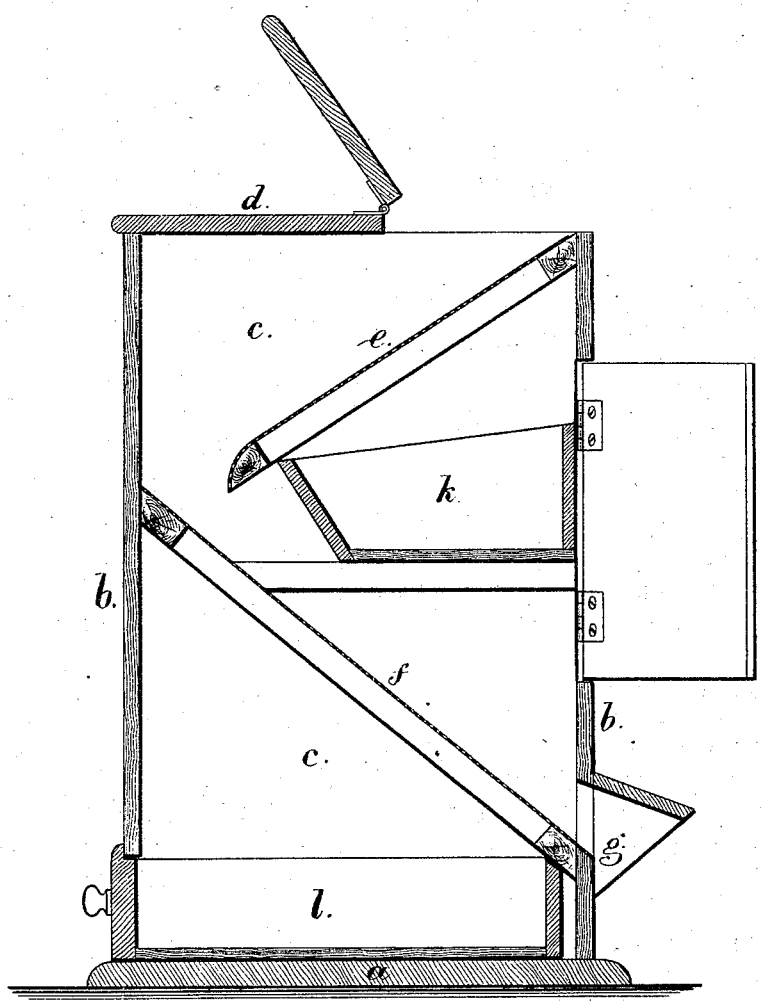

UNITED STATES PATENT OFFICE.

HORACE A. LUSCOMB, OF NEW BEDFORD, MASSACHUSETTS.

IMPROVEMENT IN COAL AND ASH SIFTERS.

Specification forming part of Letters Patent No. 155,959, dated October 13, 1874; application filed August 18, 1874.

*To all whom it may concern:*

Be it known that I, HORACE A. LUSCOMB, of New Bedford, in the county of Bristol and State of Massachusetts, have invented an Improvement in Coal and Ash Sifters, of which the following is a specification:

I make use of two screens, placed within a box at opposite inclinations, so that the material delivered in at the top of the box runs down one screen, and falls from its lower end upon the next screen, and traverses that in the opposite direction, the coal, cinders, or other similar material, that does not pass through the screens, being delivered from a mouth at the lowest end of the sieve into a suitable receptacle; the ashes or dust passing through the first screen fall into a drawer between the sieves, and the finer coal or refuse matter passing through the second screen is received into a drawer at the bottom of the box.

In the drawing my invention is shown by a vertical section.

The sifter-box is made of a bottom, $a$, and sides $b\ b$ and $c$, and a top, $d$. In the top there is a lid or flap that is thrown open for the reception of the ashes and cinders, which are preferably supplied, in small quantities at a time, upon the inclined screen $e$ that is fastened within the box; and there is a sufficient distance between the lower end of the screen $e$ and the side $b$ of the box to allow the coal or cinders to pass from the screen $e$ upon the screen $f$, that is placed diagonally in the opposite direction, within the box, and terminates at the lower end at the delivery-mouth $g$, from which the coal or cinders pass, and are received into a suitable separate vessel, or they may be removed by a shovel if they fall on the ground. Between the screens $e\ f$ there is an ash or dust receptacle, $k$, made as a drawer, so that it can be removed and emptied; and another drawer, $l$, is provided in the bottom of the sifter-box for receiving the dust or particles passing through the sieve $f$.

This coal or ash sifter is very compact; the sifting is done without the screens being shaken; there is but little opportunity for dust to escape; and the separation of dust and ashes from the coal or cinders is most perfect.

I do not claim a coal or ash sifter made with screens inclined in opposite directions, as these have been used, but not arranged in respect to the ash-drawers as in my screen.

I claim as my invention—

The coal or ash sifter, made of the screens $e\ f$, inclined in opposite directions within the box, and with the drawer $l$ below the screen $f$, and the drawer $k$ between the screens $e$ and $f$, the parts being arranged and constructed as and for the purposes set forth.

Signed by me this 13th day of August, A. D. 1874.

HORACE A. LUSCOMB.

Witnesses:
I. C. RAY,
WILLIAM BOSWORTH.